US012365309B2

(12) United States Patent
Van Wiemeersch et al.

(10) Patent No.: US 12,365,309 B2
(45) Date of Patent: Jul. 22, 2025

(54) HIDEABLE SECURITY KEY USING NEAR FIELD COMMUNICATION

(71) Applicant: FORD GLOBAL TECHNOLOGIES, LLC, Dearborn, MI (US)

(72) Inventors: John R. Van Wiemeersch, Novi, MI (US); Vivekanandh Elangovan, Canton, MI (US); Thomas J. Hermann, Troy, MI (US); Eugene Karpinsky, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 18/127,232

(22) Filed: Mar. 28, 2023

(65) Prior Publication Data
US 2024/0326739 A1    Oct. 3, 2024

(51) Int. Cl.
| | |
|---|---|
| *B60R 25/23* | (2013.01) |
| *B60R 25/01* | (2013.01) |
| *B60R 25/24* | (2013.01) |
| *B60R 25/25* | (2013.01) |
| *G07C 9/00* | (2020.01) |

(52) U.S. Cl.
CPC .............. *B60R 25/23* (2013.01); *B60R 25/01* (2013.01); *B60R 25/24* (2013.01); *B60R 25/252* (2013.01); *B60R 2325/103* (2013.01)

(58) Field of Classification Search
CPC ......... B60R 25/23; B60R 25/01; B60R 25/24; B60R 25/252; G07C 9/00; H04W 4/80
See application file for complete search history.

(56) References Cited

U.S. PATENT DOCUMENTS

| | | | | |
|---|---|---|---|---|
| 4,829,796 A | * | 5/1989 | Kim ................... | B60K 15/0409 70/168 |
| 11,034,330 B2 | | 6/2021 | DeLong et al. | |
| 11,267,439 B2 | | 3/2022 | Elangovan et al. | |
| | | (Continued) | | |

FOREIGN PATENT DOCUMENTS

| | | |
|---|---|---|
| CN | 113178027 A | 7/2021 |
| CN | 114038094 A | 2/2022 |

OTHER PUBLICATIONS

Product Datasheet for Magnet/Fridge NFC Card—Item WT-G_N13_PVC_MAGN_DTC_0 sold by NFC Solutions, Ltd., retrieved from https://nfctagify.com/product/self-adhesive-nfc-card-custom-printed-encoded-ntag213-144-bytes/?print-products=pdf on Feb. 2, 2023.

*Primary Examiner* — Tan Q Nguyen
(74) *Attorney, Agent, or Firm* — Frank L. Lollo; MacMillan, Sobanski & Todd, LLC

(57) ABSTRACT

A hideable security key for a vehicle comprises a protective body which receives a fastening member configured to hold the hideable security key to an externally-accessible surface of the vehicle. A near-field communication (NFC) antenna is disposed in the protective body. An NFC controller is disposed in the protective body and is configured to drive a security key signal to the NFC antenna. A set of code entry elements are supported on the protective body adapted for manipulation by a user to input a predetermined passcode. The NFC controller is inhibited from driving the security key signal to the NFC antenna unless the user first inputs the predetermined passcode.

20 Claims, 3 Drawing Sheets

(56) References Cited

U.S. PATENT DOCUMENTS

| | | | |
|---|---|---|---|
| 2005/0199021 A1* | 9/2005 | Freeman | E05B 67/36 |
| | | | 70/63 |
| 2016/0371907 A1* | 12/2016 | Ma | G06F 3/0227 |
| 2017/0263066 A1* | 9/2017 | Kang | G07C 9/00309 |
| 2021/0027558 A1* | 1/2021 | Elangovan | H04W 4/80 |
| 2021/0370877 A1* | 12/2021 | Peterson | B60R 16/023 |
| 2022/0108120 A1* | 4/2022 | Van Wiemeersch | |
| | | | G07C 9/00563 |
| 2022/0192008 A1* | 6/2022 | Ahmed | B60R 25/20 |
| 2022/0258695 A1 | 8/2022 | Van Wiemeersch et al. | |
| 2023/0202279 A1* | 6/2023 | St. Felix | B60J 11/04 |
| | | | 340/426.1 |
| 2024/0270183 A1* | 8/2024 | Charoosaie | B60R 7/087 |

* cited by examiner

HIDEABLE SECURITY KEY USING NEAR FIELD COMMUNICATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electronic vehicle security systems, and, more specifically, to a hideable security card (typically concealable in an exterior region of a vehicle) for retrieval and use as a backup to a key fob or smartphone entry device usually carried by an authorized user of the vehicle.

Mechanical keys traditionally used for unlocking access doors to motor vehicles and for unlocking a steering wheel and starting a propulsion unit (e.g., internal combustion engine or electric vehicle powertrain) have been gradually replaced by passive and active electronic devices. Active devices include key fobs and smartphones (e.g., Phone-as-a-Key) which are carried by the users and keypads which may be installed on an outer surface of the vehicle (e.g., on a B-pillar, a door panel, or window glass). Passive devices include transponders or near field communication (NFC) cards.

A common practice used with mechanical keys has been to store a backup key in a small box which can be hidden somewhere on a vehicle (e.g., concealed within a wheel well or behind a bumper or a license plate) to be retrieved in the event that a user loses their main key. A typical box may include a sealable compartment and at least one magnet for attaching the box to a metal surface of the vehicle.

With electronic entry systems, multiple mobile devices using more than one communication protocol may often be implemented for one vehicle. Some devices may access one aspect of security (e.g., remote door unlocking) and some may interact with many security features (e.g., door unlocking and starting a vehicle). Some devices such as a smartphone may use multiple wireless technologies which could be used to communicate with vehicle-mounted devices, such as both Bluetooth® communication and Near Field Communication (NFC). In addition to unavailability because of being misplaced, some electronic devices may also become unusable if their internal power source (e.g., a battery) becomes depleted. Thus, many users having fully electronic security systems without any mechanical key backup may also desire to store a backup electronic device on the vehicle for emergency use.

For some electronic devices such as a smartphone or other devices with large size and/or high cost, the provision of a backup unit may be impractical. Even for smaller devices such as a key fob, a hideable box of sufficient size may be impractical or unavailable. Furthermore, hideable boxes are subject to the possibility that a potential thief or other unauthorized person may discover the hidden box and be able to access the vehicle when the backup device is retrieved and activated.

SUMMARY OF THE INVENTION

In one aspect of the invention, a hideable security key for a vehicle comprises a protective body which receives a fastening member configured to hold the hideable security key to an externally-accessible surface of the vehicle. A near-field communication (NFC) antenna is disposed in the protective body. An NFC controller is disposed in the protective body and is configured to drive a security key signal to the NFC antenna. A set of code entry elements are supported on the protective body adapted for manipulation by a user to input a predetermined passcode. The NFC controller is inhibited from driving the security key signal to the NFC antenna unless the user first inputs the predetermined passcode.

The security key signal may be utilized for controlling vehicle entry and/or for activating vehicle accessories or operational functions such as activating a vehicle powertrain. The hideable security key may be read by a vehicle NFC reader disposed on the exterior or within the interior of the vehicle. When functions other that vehicle entry are available, then the hideable security key may be normally stowed within the vehicle interior for use as a backup key to the available functions (e.g., when a user has other means for obtaining vehicle entry).

DETAILED DESCRIPTION OF PREFERRED EMBODIMENTS

Figure 1:
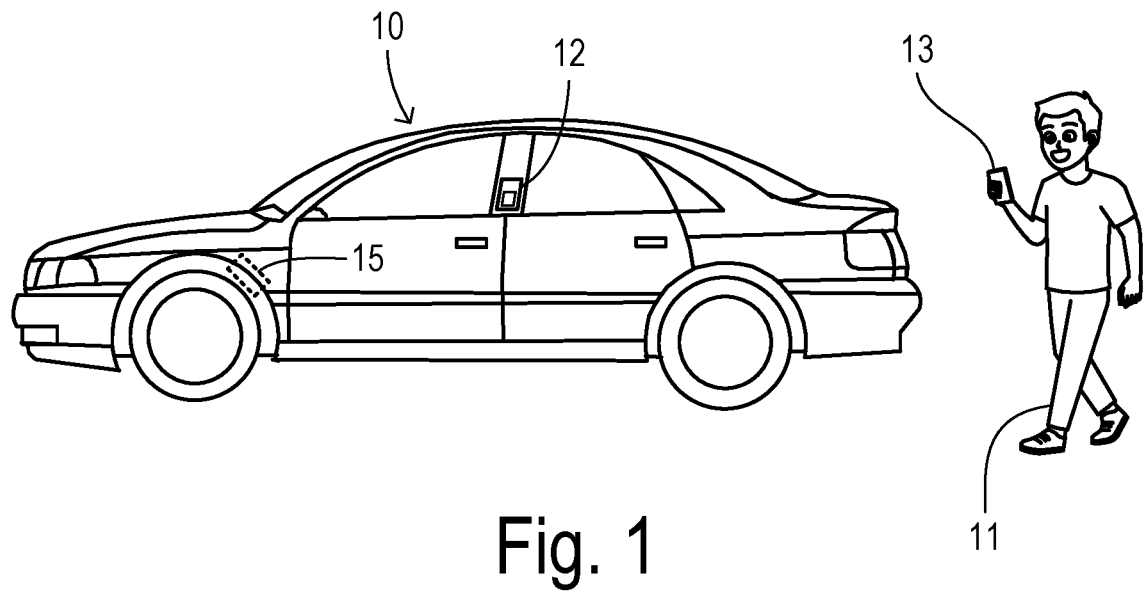
FIG. 1 is a schematic diagram showing a vehicle for receiving a hidden electronic backup key.

Referring to FIG. 1, a vehicle 10 is accessible to a user 11 by interaction between a vehicle interface 12 and a mobile security device 13 (e.g., a smartphone, wireless fob, or transponder card). Mobile device 13 may also communicate with other vehicle-mounted receives such as a remote entry transceiver. Interface 12 may, for example, include an NFC antenna to perform near field communication between a vehicle security controller (not shown) and security device 13. If device 13 is lost, misplaced, or otherwise unavailable, user 11 may retrieve a backup device 15 which was previously hidden in an exterior region of vehicle 10 for placement adjacent interface 12 to obtain vehicle access. Hideable entry key device 15 may be preprogrammed with a security code giving it a unique identification, and it may specify a set or subset of available security functions such as door unlocking and/or driving controls (e.g., engine start). Hideable device 15 may typically derive power from vehicle 10 through interface 12, but may alternatively include its own power source. In some preferred embodiments, hideable device 15 includes an NFC transceiver operating according to NFC industry standards. Device 15 may alternatively include other short range (i.e., near field) communication methods such as a Bluetooth® protocol or Ultra-Wideband (UWB). In the case of Bluetooth®, it may be preferable to use Bluetooth® Low Energy (BLE). The BLE communication may utilize backscatter as known in the art.

Figure 2:
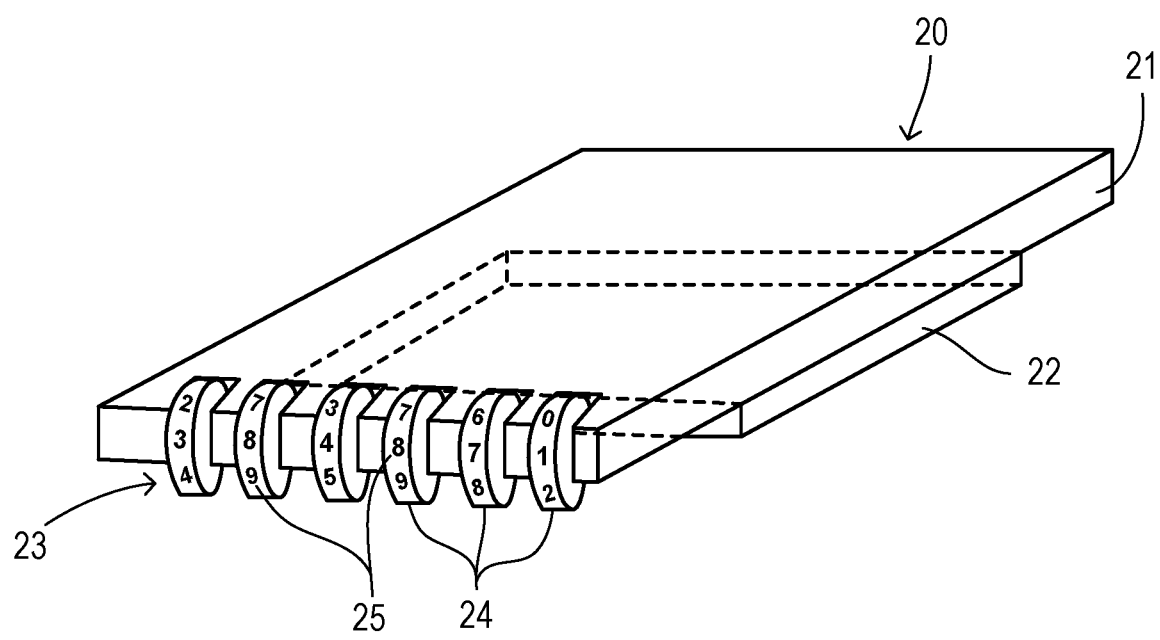
FIG. 2 is a perspective view of a hideable entry key according to one embodiment.

FIG. 2 shows a hideable entry key 20 having a card-shaped protective body 21 and a magnetic fastening member 22 affixed to one side of body 21. Magnet member 22 is configured to hold key 20 to an externally accessible surface of the vehicle such as a metallic chassis structure or body panel. Disposed inside protective body 21 is a near field communication (NFC) transceiver which is activatable only in response to the setting of a predetermined passcode using a set of code entry elements 23 which are disposed at one edge of protective body 21. The set of code entry elements 23 comprises a plurality of movable discs or wheels 24 which are labeled with particular symbols such as numbers for depicting the predetermined passcode. Movable discs (e.g., lock wheels) 24 could be labeled with numerals 0 through 9, whereby a set of six movable discs 24 would provide almost one million possible combinations for the predetermined passcode. As explained below, movable discs 24 may carry embedded conductive segments which cooperatively generate a conductive path across all the movable discs when they are turned into a predetermined configuration in which symbols 25 depict the predetermined passcode. Thus, even if an unauthorized person discovers the hidden entry key, it cannot be used to access the vehicle unless the predetermined passcode is also discovered. Once discs 24 are in the correct positions, the NFC transceiver can securely communicate with the vehicle when placed within the required proximity of a vehicle NFC reader.

Figure 3:
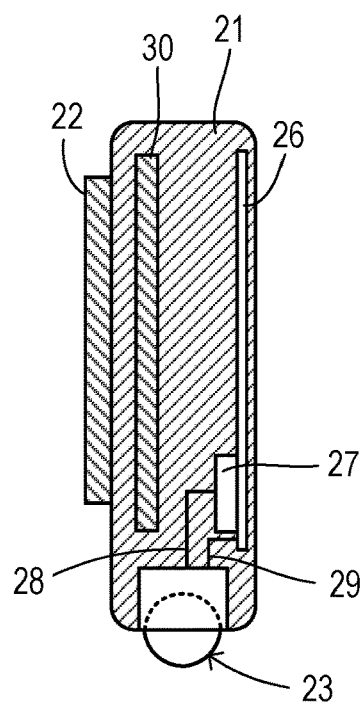
FIG. 3 is a side cross-sectional view of the hideable entry key of FIG. 2.
Figure 4:
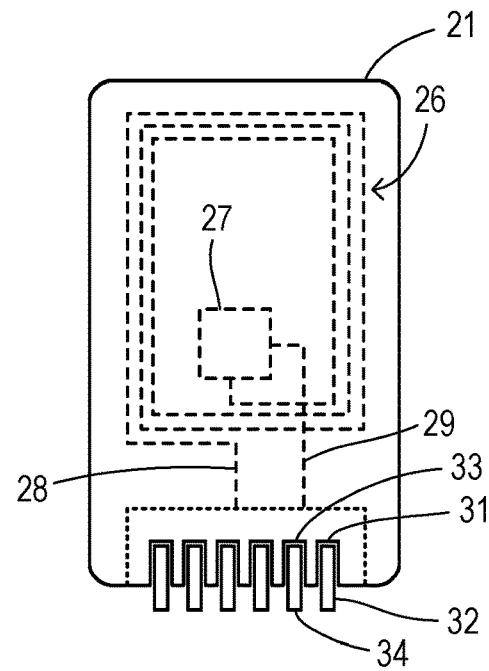
FIG. 4 is a plan view of the hideable entry key of FIG. 2.

Entry key 20 is shown in greater detail in FIGS. 3 and 4. An NFC antenna 26 is disposed in protective body 21 at or adjacent to the opposite surface from magnet member 22. Also disposed in protective body 21 is an NFC controller 27 which may be comprised of a commercially-available integrated circuit. Together, NFC antenna 26 and NFC controller 27 make up the NFC transceiver (e.g., transponder), wherein NFC controller 27 is configured to securely communicate with the vehicle NFC antenna 26 (e.g., to send the security key signal). The set of code entry elements 23 are electrically connected to conductors 28 and 29, between NFC controller 27 and NFC antenna 26. In FIG. 3, the typical thickness of protective body 21 is exaggerated in order to more clearly show the internal components. Protective body 21 may be a molded plastic body encapsulating the NFC transceiver components together with a ferrite shield 30 which reduces degradation of the operation of NFC antenna 26 that may be caused by the magnetic field of magnet member 22.

Figure 5:
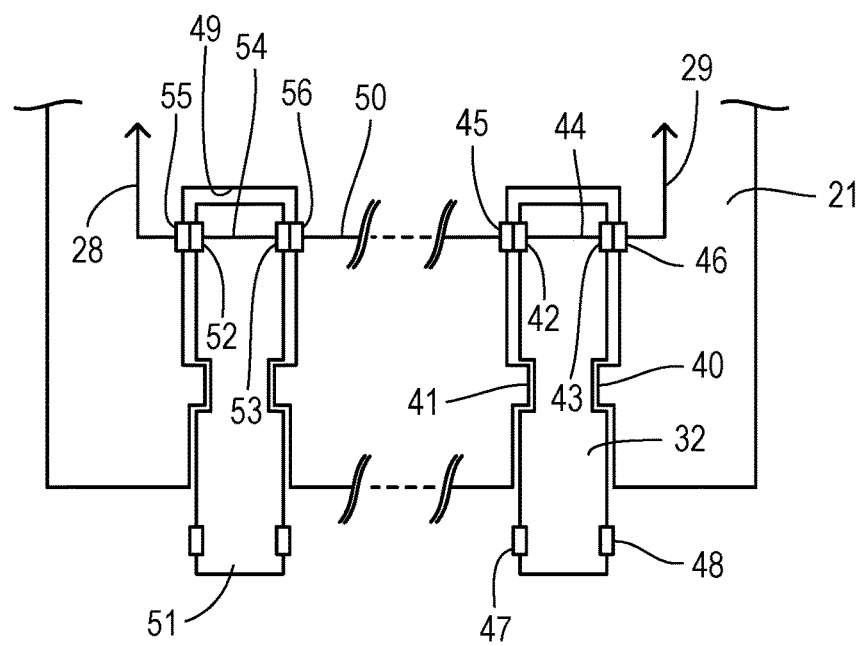
FIG. 5 is a top cross-sectional view showing code entry elements of the hideable entry key of FIG. 2.

As shown in FIG. 4, movable discs 24 may be each installed within a respective slot on an edge of protective body 21. For example, a disk 32 is retained in a slot 31 and a disk 34 is retained in a slot 33. As shown in FIG. 5, the movable discs (of which disc 32 and a disc 51 are shown) generate a continuous conductive path by mechanically interconnecting various conductors which span across respective discs 24. By arranging the conductive path electrically between the NFC controller and the NFC antenna, the security key signal can be obtained via the NFC antenna only when the movable disks are moved into the predetermined configuration.

Disk 32 rotates within slot 31 on a pair of hubs 40 and 41. A pair of contact pads 42 and 43 disposed on opposing outer surfaces of disk 32 are connected internally by a conductor 44. Projecting out of opposite sides of slot 31 are a pair of stationary conductive pads 45 and 46 which are adapted to make contact with pads 42 and 43 when movable disc 32 is in the correct position. In order to disguise which particular symbol corresponds to the predetermined passcode, dummy conductor pads 47 and 48 may be disposed on outer surfaces of movable disc 32 corresponding to each of the available symbols which are not part of the predetermined passcode. The dummy connector pads may be composed of non-metallic material or painted with non-metallic paint of the same color as the functional pads, and they remain electrically isolated in order to not reduce the total possible number of mathematical combinations.

Internal conductors 50 connect the stationary connection pads in a daisy chain across all of the disk receiving slots. At the other end of the daisy chain, a slot 49 in the edge of protective body 21 receives a movable disc 51 with contact pads 52 and 53 joined by a conductor 54. When disc 51 is in the correct position, then conductor pads 52 and 53 make contact with stationary pads 55 and 56, completing the electrical circuit between conductors 28 and 29. Likewise, disc 51 may include dummy pads corresponding to each of the other available symbols.

Figure 6:
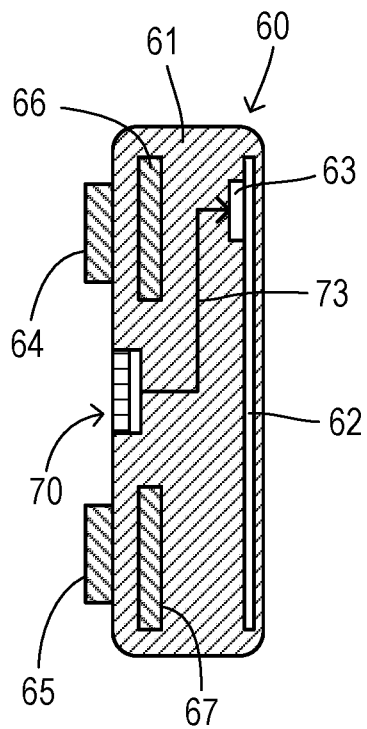
FIG. 6 is a side cross-sectional view of another embodiment of the hideable entry key.
Figure 7:
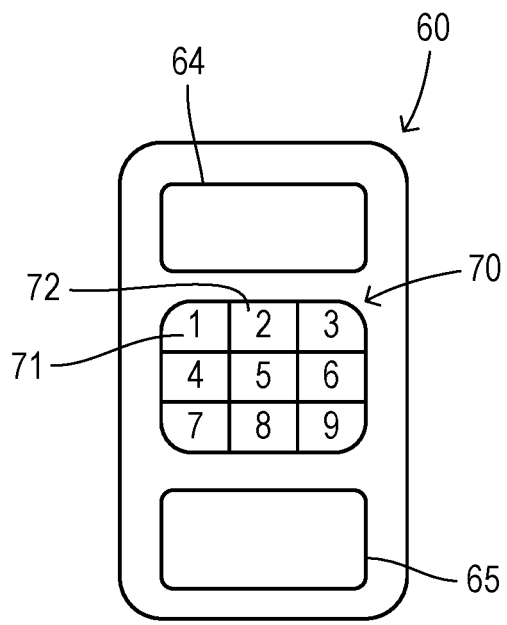
FIG. 7 is a plan view of the hideable entry key of FIG. 6.
Figure 8:
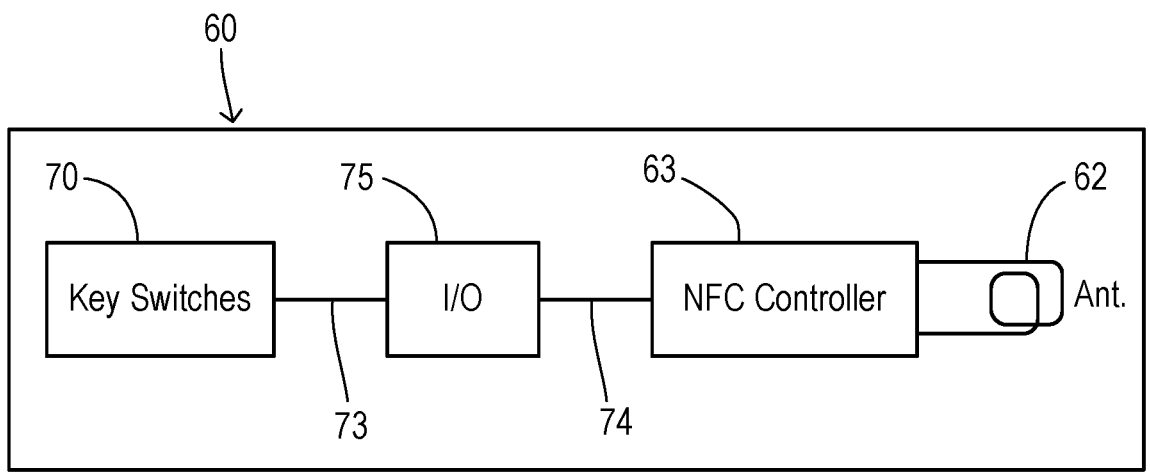
FIG. 8 is a block diagram of the hideable entry key of FIG. 6.

In another embodiment shown in FIGS. 6-8, a digital keypad or other nonmechanical device may be used instead of the mechanical lock wheels. Thus, a hideable entry key 60 has a protective substrate (protective body) 61 containing an NFC antenna 62 and an NFC controller 63. On the opposite side from NFC antenna 62, a pair of mounting magnet members 64 and 65 are affixed to substrate 61. Ferrite shields 66 and 67 are disposed in substrate 61 spanning the area of magnet 64 and 65 so that magnets 64 and 65 do not interfere with NFC communication. A digital keypad 70 is disposed on the surface of substrate 61 between magnets 64 and 65. Keypad 70 includes a plurality of momentary contact switches such as switches 71 and 72 identifying respective symbols used in a predetermined passcode. The momentary contact switches may be comprised of membrane switches, for example. As shown in FIG. 8, switches 70 may be coupled to NFC controller 63 via an input/output interface 75 and conductors 73 and 74.

Power for activating the NFC transceiver is derived from oscillating signals received from the vehicle NFC reader, when entry key 60 is placed with NFC antenna 62 adjacent to the vehicle NFC reader. Once power has been harvested to operate the NFC transceiver in entry key 60, the user can operate key switches 70 to enter the predetermined passcode while NFC antenna 62 stays in contact with the vehicle NFC reader. Entry key 60 can be provided with elements enabling it to create a chirp sound or other notification that sufficient power has been accumulated.

In other embodiments, keypad 70 may include a biometric sensor such as a fingerprint reader. Thus, data from the biometric sensor may be provided to the NFC controller which is preconfigured to match the data collected by the biometric sensor with preconfigured biometric data such as fingerprint data of an authorized user.

In some embodiments, the NFC controller may be configured to store a plurality of predetermined passcodes corresponding to respective access levels each comprising corresponding functions of the vehicle. Recognition of a respective predetermined passcode may enable the NFC controller to drive a respective security key signal for initiating the respective access level, such as vehicle unlocking or obtaining operation of other vehicle systems.

The hideable security key of the invention can be made to be waterproof. For example, the NFC controller chip (e.g., 27 or 63) may be conformally coated during formation of the card protective body. A digital keypad (e.g., 70) may have a rubber seal. Mechanical passcode wheels (e.g., 24) may be made of gold or stainless steel.

In the same manner as existing NFC transponders associated with a smartphone or other mobile security device carried by the driver of a vehicle, the NFC security card of this invention would be programmed into the security system of the vehicle. For example, an owner/driver may have two or more existing security keys of various kinds which they can use to authorize/authenticate the hideable security key by instructing the vehicle security system to recognize it. Alternatively, a sales or service dealer could program the hideable key into the vehicle.

What is claimed is:

1. A hideable security key for a vehicle, comprising:
a portable protective body;
a fastening member configured to hold the hideable security key to an externally-accessible surface of the vehicle;
a near-field communication (NFC) antenna disposed in the protective body;
an NFC controller disposed in the protective body and configured to drive a preprogrammed security key signal to the NFC antenna which is received by an NFC reader on the vehicle;
a set of code entry elements supported on the protective body adapted for manipulation by a user to input a predetermined passcode different from the preprogrammed security key signal;
wherein the NFC controller is inhibited from driving the security key signal to the NFC antenna unless the user first inputs the predetermined passcode.

2. The hideable security key of claim 1 wherein the set of code entry elements is comprised of a plurality of momentary contact switches on an outer surface of the protective body and coupled with the NFC controller, wherein the NFC controller is configured to drive the security key signal only after recognizing input of the predetermined passcode using the momentary contact switches.

3. The hideable security key of claim 1 wherein the set of code entry elements is comprised of at least one biometric sensor, and wherein the NFC controller is configured to match data collected by the biometric sensor with preconfigured fingerprint data of an authorized user.

4. The hideable security key of claim 1 wherein the set of code entry elements is comprised of a plurality of movable disks each carrying a respective conductive segment, wherein the segments cooperatively generate a conductive path when the movable disks are moved into a predetermined configuration in which symbols on the movable disks depict the predetermined passcode.

5. The hideable security key of claim 4 wherein the conductive path electrically interconnects the NFC controller with the NFC antenna so that the security key signal can be driven to the NFC antenna only when the movable disks are moved into the predetermined configuration.

6. The hideable security key of claim 5 wherein the movable disks each includes dummy connector terminals to disguise which symbols correspond to the predetermined passcode.

7. The hideable security key of claim 1 wherein the fastening member is comprised of a magnet affixed to an outer surface of the protective body.

8. The hideable security key of claim 7 further comprising a ferrite shield disposed in the protective body between the magnet and the NFC antenna.

9. The hideable security key of claim 1 wherein the NFC controller is configured to store a plurality of predetermined passcodes corresponding to respective access levels each comprising corresponding functions of the vehicle, and wherein recognition of a respective predetermined passcode enables the NFC controller to drive a respective security key signal for initiating the respective access level.

10. The hideable security key of claim 9 wherein the corresponding functions include unlocking a door of the vehicle, activating a vehicle accessory system, and enabling driving of the vehicle.

11. The hideable security key of claim 1 configured to provide waterproof protection of the NFC controller and the code entry elements, and wherein oscillating signals from the NFC reader are harvested to power the NFC controller.

12. A hideable security key for a vehicle, comprising:
a portable protective substrate forming a generally flat plate with a reading surface on a first side of the flat plate and a mounting surface on a second side of the flat plate opposing the first side;
a permanent magnet member affixed to the mounting surface which is configured to hold the hideable security key to an externally-accessible surface of the vehicle;
a near-field communication (NFC) antenna disposed in the protective substrate adjacent the reading surface;
an NFC controller disposed in the protective substrate and configured to drive a preprogrammed security key signal to the NFC antenna which is received by an NFC reader on the vehicle, and wherein oscillating signals from the NFC reader are harvested to power the NFC controller;
a set of code entry elements supported on the protective substrate adapted for manipulation by a user to input a predetermined passcode;
wherein the NFC controller is inhibited from driving the security key signal to the NFC antenna unless the user first inputs the predetermined passcode.

13. The hideable security key of claim 12 wherein the set of code entry elements is comprised of a plurality of momentary contact switches on the protective substrate and coupled with the NFC controller, wherein the NFC controller is configured to drive the security key signal only after recognizing input of the predetermined passcode using the momentary contact switches.

14. The hideable security key of claim 12 wherein the set of code entry elements is comprised of at least one biometric sensor, and wherein the NFC controller is configured to match data collected by the biometric sensor with preconfigured fingerprint data of an authorized user.

15. The hideable security key of claim 12 wherein the set of code entry elements is comprised of a plurality of movable disks each carrying a respective conductive segment, wherein the segments cooperatively generate a conductive path when the movable disks are moved into a predetermined configuration in which symbols on the movable disks depict the predetermined passcode.

16. The hideable security key of claim 15 wherein the conductive path electrically interconnects the NFC controller with the NFC antenna so that the security key signal can be driven to the NFC antenna only when the movable disks are moved into the predetermined configuration.

17. The hideable security key of claim 12 wherein the plurality of movable disks are disposed at an edge of the flat plate.

18. The hideable security key of claim 12 further comprising a ferrite shield disposed in the protective substrate between the magnet and the NFC antenna.

19. The hideable security key of claim 12 wherein the NFC controller is configured to store a plurality of predetermined passcodes corresponding to respective access levels each comprising corresponding functions of the vehicle, and wherein recognition of a respective predetermined passcode enables the NFC controller to drive a respective security key signal for initiating the respective access level.

20. The hideable security key of claim 19 wherein the corresponding functions include unlocking a door of the vehicle, activating a vehicle accessory system, and enabling driving of the vehicle.

* * * * *